(12) United States Patent
Mäenpää et al.

(10) Patent No.: US 10,091,261 B2
(45) Date of Patent: Oct. 2, 2018

(54) METHODS AND NODES FOR ENABLING A PEER-TO-PEER TELECONFERENCE

(71) Applicant: TELEFONAKTIEBOLAGET L M ERICSSON (publ), Stockholm (SE)

(72) Inventors: Jouni Mäenpää, Nummela (FI); Oscar Novo Diaz, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 520 days.

(21) Appl. No.: 14/442,818

(22) PCT Filed: Nov. 14, 2012

(86) PCT No.: PCT/SE2012/051254
§ 371 (c)(1),
(2) Date: May 14, 2015

(87) PCT Pub. No.: WO2014/077743
PCT Pub. Date: May 22, 2014

(65) Prior Publication Data
US 2015/0295965 A1    Oct. 15, 2015

(51) Int. Cl.
*H04L 29/06* (2006.01)
*H04M 3/56* (2006.01)
(Continued)

(52) U.S. Cl.
CPC ...... *H04L 65/4046* (2013.01); *H04L 12/1818* (2013.01); *H04L 65/1006* (2013.01);
(Continued)

(58) Field of Classification Search
CPC ............ H04L 65/1069; H04L 65/4046; H04L 67/1061; H04L 67/16; H04L 65/1006;
(Continued)

(56) References Cited

U.S. PATENT DOCUMENTS

2004/0174830 A1*  9/2004  Koskelainen ....... H04L 12/1822
                                                  370/260
2005/0021619 A1*  1/2005  Gomes
                          de Oliveira ............... H04L 12/1813
                                                  709/204

(Continued)

OTHER PUBLICATIONS

G. Camarillo et al., "The Binary Floor Control Protocol (BFCP)" Network Working Group, Request for Comments: 4582, Category: Standards Track, IETF Trust, Nov. 2006, 65 pages.
(Continued)

*Primary Examiner* — Chris Parry
*Assistant Examiner* — Stephen Houlihan
(74) *Attorney, Agent, or Firm* — Rothwell, Figg, Ernst & Manbeck, P.C.

(57) ABSTRACT

Methods and nodes for enabling a teleconference involving multiple peer nodes in a P2P network (502). A first peer node (500) appoints a subset of the peer nodes to act as Floor Control Peers, FCPs, (504) in a floor control overlay by handling floor requests from peer nodes to make input to a floor in the teleconference. The first peer node (500) creates a tree structure (506) of the appointed FCPs which is distributed to the P2P network and can be accessed by a joining peer node to discover a primary FCP in the tree and send floor requests to the primary FCP. A floor chair function (508) is also created in the floor control overlay maintaining a floor record (508a) with information about floor utilization which can be provided to the FCPs. Thereby, joining peer nodes are enabled to join the teleconference and find respective primary FCPs in the floor control overlay based on the tree structure, and to make input to the at least one floor of the teleconference depending on the information in the floor record. In this way, the teleconference is handled by the appointed FCPs and does not require any centralized components for floor control.

22 Claims, 6 Drawing Sheets

(51) Int. Cl.
  *H04N 7/15*  (2006.01)
  *H04M 7/00*  (2006.01)
  *H04L 12/18* (2006.01)
  *H04L 29/08* (2006.01)
(52) U.S. Cl.
  CPC ...... *H04L 65/1016* (2013.01); *H04L 65/1069* (2013.01); *H04L 67/104* (2013.01); *H04L 67/1061* (2013.01); *H04L 67/16* (2013.01); *H04M 3/56* (2013.01); *H04M 7/0063* (2013.01); *H04N 7/15* (2013.01); *H04L 67/1093* (2013.01)
(58) Field of Classification Search
  CPC ............. H04L 65/1016; H04L 67/1093; H04L 67/104; H04L 12/1818; H04M 7/0063; H04M 3/56; H04N 7/15
  See application file for complete search history.

(56) References Cited

U.S. PATENT DOCUMENTS

| | | | |
|---|---|---|---|
| 2007/0036175 A1 | 2/2007 | Zimmermann et al. | |
| 2007/0211703 A1* | 9/2007 | Gu | H04L 12/1818 370/356 |
| 2009/0137263 A1 | 5/2009 | Abbate et al. | |
| 2010/0115089 A1* | 5/2010 | Camarillo Gonzalez | H04L 65/1006 709/224 |
| 2010/0215162 A1* | 8/2010 | Gupta | H04M 3/56 379/142.06 |
| 2010/0226289 A1 | 9/2010 | Mäenpää et al. | |
| 2011/0149810 A1* | 6/2011 | Koren | H04L 12/185 370/261 |
| 2011/0165905 A1* | 7/2011 | Shuman | H04W 4/02 455/518 |
| 2011/0252151 A1* | 10/2011 | Lu | H04W 80/045 709/228 |
| 2011/0299427 A1* | 12/2011 | Chu | H04L 12/1822 370/256 |
| 2015/0200982 A1* | 7/2015 | Velagaleti | H04L 65/403 715/753 |

OTHER PUBLICATIONS

Extended European Search Report issued in corresponding Application No. 12888500.1, dated Nov. 6, 2015, 7 pages.

Elleuch, Wajdi et al., "Multiparty Voice over IP (MVoIP) Peer-based System for Large-scale Conference Support," IEEE Internaitonal Conference on Wireless & Mobile Computing, Networking & Communications, ISBN 978-0-7695-3393-3, Oct. 12, 2008, 2 pages.

Joung, Yuh-Jzer et al., "P2PConf: A Medium-Size P2P Internet Conference with Effective Floor Control," ISBN 978-89-960761-1-7, Jan. 23, 2008, 5 pages.

International Search Report and Written Opinion issued in corresponding application No. PCT/SE2012/051254, dated Nov. 12, 2013, 12 pages.

* cited by examiner

METHODS AND NODES FOR ENABLING A PEER-TO-PEER TELECONFERENCE

CROSS REFERENCE TO RELATED APPLICATION(S)

This application is a 35 U.S.C. § 371 National Phase Entry Application from PCT/SE2012/051254, filed Nov. 14, 2012, the disclosure of which is incorporated by reference.

TECHNICAL FIELD

The present disclosure relates generally to a first peer node and method therein, and a joining peer node and method therein, for enabling a teleconference involving multiple peer nodes in a peer-to-peer network. The peer nodes are capable of making input to at least one floor of the teleconference.

BACKGROUND

Today, there are solutions for performing a teleconference with several participants, such as terminal users and machines, which are linked by a telecommunications network. A common usage of teleconference is to conduct a meeting or the like with participants that are located remote from each other. A conference call can be configured such that a calling party calls the other participants and adds them to the call. Further, participants are also able to call into the conference call themselves by dialing a telephone number that connects to a conference bridge which is a specialized type of equipment in the network that links telephone connections used by the participants. A specialized service provider maintains the conference bridge and provides phone numbers and PIN codes that participants can use to access the conference call.

A central control node, commonly referred to as a "floor control server", is often employed for enabling and controlling a teleconference by granting permission to speak or enter other input. In this context, the term "floor" refers to a technology or platform used for making input to the conference. Common examples of a floor include speech, video, messaging, file sharing and whiteboard. Several different floors may be used at the same time in a teleconference and the floors may be maintained and controlled by specific centralized nodes commonly called "floor chairs" being associated with the floor control server. Alternatively, the floor chair function may be implemented in the floor control server.

FIG. 1 illustrates a conventional teleconference handled by a central floor control server 100 and where multiple floor participants 102, i.e. communication terminals, can communicate with each other using shared "conference resources" 104 supporting one or more floors, which could be a bridge for voice or video streams, a whiteboard, etc., depending on what floors are used. Each floor is managed by a floor chair 106 associated with the floor control server 100. In this example, a floor participant 102a obtains permission to speak from the floor control server 100, shown by two-way arrows, and is then able to speak over the resource 104 such that his speech is conveyed to all the other participants 102, as indicated by dashed arrows. If another participant is already speaking, the requesting participant 102a can be placed in a queue to wait for his turn to speak. The floor chair 106 maintains a floor record with information about utilization of its corresponding floor.

The 3rd Generation Partnership Project, 3GPP has defined a technical solution for conferencing within an IP Multimedia Subsystem, IMS, based on the Session Initiation Protocol, SIP and the Binary Floor Control Protocol, BFCP. In traditional centralized conferencing systems, floor control is implemented using the BFCP for communication of control messages between the floor control server and the participants.

BFCP can thus be used to send floor control requests from conference participants to floor control servers e.g. requesting permission to speak, and to coordinate access to shared conference resources by granting or denying the requests. BFCP can be used between participants and floor control servers, and between floor chairs and floor control servers. In addition, floor chairs can use BFCP to send floor control servers decisions regarding floor requests. BFCP can also be used by floor control servers to inform floor chairs and floor participants about the status of the floors and the floor requests.

However, it is a problem that various centralized components with control functions are required, such as the above-described floor control server and floor chairs, which may limit the possibilities for establishing new teleconferences, e.g. in terms of capacity, conference resources, subscription restrictions, and so forth. Using centralized control functions for teleconferencing between multiple participants in a communication network is thus highly dependent on availability and performance of the central components, also demanding costs for configuring, operating and maintaining the central components. It is furthermore a somewhat vulnerable solution in that the teleconference may be impeded or otherwise negatively affected if any of the central components is out of order or malfunctions in some way.

SUMMARY

It is an object of embodiments described herein to address at least some of the problems and issues outlined above. It is thus an object to provide a solution which does not require any centralized control functions for enabling a teleconference with multiple peer nodes. It is possible to achieve these objects and others by using a method and a node as defined in the attached independent claims.

According to one aspect, a method is performed by a first peer node in a peer-to-peer, P2P, network, for enabling a teleconference involving multiple peer nodes in the P2P network. The peer nodes are capable of making input to at least one floor of the teleconference. In this method, the first peer node appoints a subset of the peer nodes to act as Floor Control Peers, FCPs, which form a floor control overlay in the P2P network. The FCPs are instructed to handle floor requests from peer nodes by granting, denying or suspending permission to make input to the at least one floor.

The first peer node also creates a tree structure in which the appointed FCPs are registered. The tree structure is distributed to the P2P network and can thereby be accessed by a joining peer node to discover a primary FCP in the tree when joining the teleconference such that the joining peer node can send floor requests to the primary FCP.

The first peer node further creates, in the floor control overlay, a floor chair function configured to maintain a floor record with information about utilization of the at least one floor and to provide said information to the FCPs. Thereby, joining peer nodes are enabled to join the teleconference and find respective primary FCPs in the floor control overlay based on the tree structure, and to make input to the at least one floor of the teleconference depending on the information in the floor record. An example advantage with this method is that the first peer node can easily and automatically establish the teleconference by creating a decentralized floor control overlay which is easily accessible by means of the tree structure in the P2P network, such that no centralized and costly components or entities are needed to provide floor control for the teleconference.

According to another aspect, a first peer node in a P2P network is configured to enable a teleconference involving multiple participating peer nodes in the P2P network which are capable of making input to at least one floor of the teleconference. The first peer node comprises an appointing unit adapted to appoint a subset of the peer nodes to act as FCPs which form a floor control overlay in the P2P network. The FCPs are instructed to handle floor requests from peer nodes by granting, denying or suspending permission to make input to the at least one floor.

The first peer node also comprises a first creating unit adapted to create a tree structure in which the appointed FCPs are registered, which tree structure is distributed to the P2P network and can be accessed by a joining peer node to discover a primary FCP in the tree when joining the teleconference such that the joining peer node can send floor requests to the primary FCP. The first peer node also comprises a second creating unit adapted to create, in the floor control overlay, a floor chair function configured to maintain a floor record with information about utilization of the at least one floor and to provide said information to the FCPs. Thereby, joining peer nodes are enabled to join the teleconference and find respective primary FCPs in the floor control overlay based on the tree structure, and to make input to the at least one floor of the teleconference depending on the information in the floor record.

According to yet another aspect, a method is performed by a joining peer node in a P2P network for joining a teleconference involving multiple peer nodes in the P2P network. The joining peer node is capable of making input to at least one floor of the teleconference. In this method, the joining peer node contacts an FCP in a floor control overlay in the P2P network to access a tree structure in which FCPs of the floor control overlay are registered. The joining peer node then discovers a primary FCP in the floor control overlay based on the accessed tree structure, and establishes a connection with the primary FCP in order to make input to the at feast one floor of the teleconference. An example advantage with this method is that the joining peer node can easily join the teleconference and make input to at least one floor of the teleconference, while no centralized and costly entities are needed to provide floor control for the teleconference.

According to yet another aspect, a joining peer node in a P2P network is configured to join a teleconference involving multiple peer nodes in the P2P network, the joining peer node being capable of making input to at least one floor of the teleconference. The joining peer node comprises a contacting unit adapted to contact an FCP in a floor control overlay in the P2P network to access a tree structure in which FCPs of the floor control overlay are registered. The joining peer node further comprises a logic unit adapted to discover a primary FCP in the floor control overlay based on the accessed tree structure, and an establishing unit adapted to establish a connection with the primary FCP in order to make input to the at least one floor of the teleconference.

The above methods and nodes may be configured and implemented according to different optional embodiments and features, which will be explained in the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
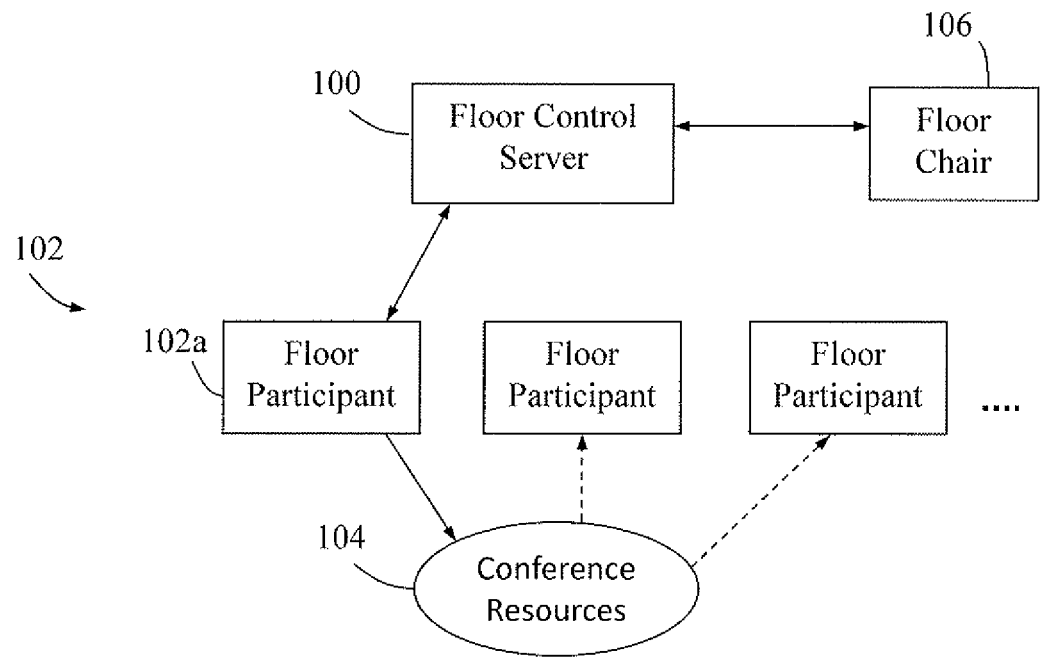
FIG. 1 is a communication scenario illustrating a conventional teleconference, according to the prior art.

Briefly described, a solution is provided to enable a teleconference for multiple participating peer nodes in a P2P network, which peer nodes are capable of making input to at least one floor of the teleconference, instead of relying on a centralized implementation of floor control server and floor chairs, this solution utilizes some of the peer nodes themselves to temporarily operate as floor control and floor chairs during the teleconference, hence in a decentralized manner. Once the teleconference is finished, the peer nodes can be released from their tasks. Thereby, a more flexible and less costly implementation for establishing and conducting a teleconference is obtained and it is possible to overcome the drawbacks of the conventional centralized solution outlined above in the background description.

In this new solution, it has also been recognized that teleconferencing between multiple peers may be enabled in a peer-to-peer P2P network by using a P2P employed Session Initiation Protocol SIP, P2PSIP for short, which in turn enables the use of a protocol called Resource Location And Discovery, RELOAD for short, to maintain the P2P network further based on the mechanism of a Distributed Hash Table DHT. RELOAD can thus be used in this solution for overlay network maintenance, information storage, connection establishment, and lookup operations, the latter also referred to as "rendezvous". However, other protocols may also be used in the embodiments herein and the solution is not limited to the possible protocols and messages mentioned in the examples below.

For service discovery, P2PSIP can use a mechanism called Recursive Distributed Rendezvous, ReDiR which is a tree structure with service providing peer nodes enabling service discovery that is efficient, scalable, and distributes load evenly among the service providing peer nodes. Thus, in a P2PSIP overlay, the service providers are regular peers that have resources or other capabilities that allow them to provide services to other peers in the P2P network. ReDiR implements service discovery by embedding the tree structure within the DHT based network, and a so-called ReDiR service discovery procedure can be used for discovery of service providing nodes in the ReDiR tree. Service registration and discovery operations can be implemented by selectively discovering tree nodes from the DHT, using the ReDiR algorithm, which nodes may be stored in so-called RELOAD resource records. These mechanisms and features can be utilized for the embodiments described herein to implement a floor control service for a distributed P2PSIP conference. Such a floor control service can be called a distributed floor control function.

As indicated above, the floor control server functionality is distributed in a decentralized manner among a subset of all the peer nodes in the teleconference, in the following description, such peer nodes will be referred to as "Floor Control Peers", FCPs which thus may at the same time be participants in the actual teleconference. The distributed FCPs form an overlay network that will be referred to as a "floor control overlay", which thus comprises a fraction of the total P2PSIP overlay network, creating a distributed floor control function which is basically capable of providing the same functionality as a conventional centralized floor control server would in a non-P2P conference. The floor control overlay may be maintained using an overlay algorithm, e.g. the known "Chord DHT algorithm".

An example of a procedure performed by a first peer node in a P2P network, for enabling a teleconference involving multiple peer nodes, will now be described with reference to the flow chart in FIG. 2. It is assumed that the peer nodes participating in the teleconference are capable of making input to at least one floor of the teleconference. It is also assumed that a user of the first peer node decides to establish the teleconference, which may be done by activating a suitable computer program being installed in the first peer node and configured to cause the first peer node to perform the actions described below, it may also be possible for the user to input various parameters, settings and commands to the computer program for configuring the teleconference as desired, e.g. defining one or more floors to which input can be made in the forthcoming teleconference. Alternatively, at least some parameters and settings for configuring the teleconference may have been preconfigured by default in the computer program. Some possible but non-limiting examples of floors that can be used in this context include speech, video, messaging, file sharing and whiteboard.

In a first shown action 200, the first peer node appoints a subset of the peer nodes participating in the teleconference to act as FCPs which form a floor control overlay in the P2P network. Effectively, the FCPs are instructed to handle floor requests from peer nodes by granting, denying or suspending permission to make input to the floor(s). In practice, the FCPs may be appointed one at a time, appropriately when the peer nodes join the teleconference one by one. Hence, this action may be repeated at any time during the teleconference, e.g. after any of the following actions.

In one possible embodiment, the number of FCPs in the subset to use in the teleconference may be determined based on a density parameter indicating a percentage of the total number of peer nodes participating in the teleconference. The FCPs may in that case be appointed one by one according to the density parameter when the peer nodes join the teleconference. For example, the density parameter may be set to 5, implying that every fifth joining peer should be appointed to act as FCP. If there are 15 participating peer nodes, three of them will be appointed as FCPs according to the density parameter 5. In another possible embodiment, the above density parameter may be adaptive depending on the number of peer nodes participating in the teleconference. It might thus be assumed that when there are many participating peer nodes, the density parameter can be set to a relatively high value provided that each FCP can handle a large number of peers since each individual peer is likely to make input not very frequently as the floor must be shared with many others. In yet another possible embodiment, the FCPs may be appointed based on capabilities of the FCPs, such that a peer node can only be appointed as FCP if it has the capabilities required for the FCP tasks, e.g. in terms of processing and/or storing capacity. The capabilities in this context may also include availability of the peer node as well as bandwidth used, and battery power.

In a next action 202, the first peer node creates a tree structure in which the appointed FCPs are registered, which tree structure is distributed to the P2P network and can be accessed by a joining peer node to discover a primary FCP in the tree when joining the teleconference. Once discovered, the joining peer node can send floor requests to the primary FCP. Creating the tree structure includes defining a namespace for the tree which will be used by joining peer nodes for accessing the tree. In a possible embodiment, a conference Uniform Resource Identifier, URI is defined as namespace of the tree structure, e.g. according to a format like conference1@overlay.net or similar.

Information about the FCPs, e.g. their node identities, is thus maintained within nodes in the created tree structure such that the tree nodes are resource records stored in the P2P network. These nodes can be discovered by applying a suitable algorithm, which may be an algorithm used in the above-mentioned ReDiR procedure, for service discovery. In this context, the term "primary" thus indicates that the primary FCP will be selected more or less exclusively by the joining peer node to receive and handle any floor requests from the joining peer node. An FCP may be the primary FCP for any number of peer nodes in the teleconference. As mentioned above, using an algorithm such as the algorithm of the ReDiR procedure for node discovery provides for evenly distributed load on the FCPs.

Distributing the tree structure to the P2P network means that the FCP nodes of the tree structure, i.e. records with information about the nodes, are stored at different locations, i.e. peer nodes, across the P2P network. In one possible embodiment, the tree structure of the FCPs is created as a ReDiR tree which enables the joining peer nodes to run a ReDiR service discovery process, including the ReDiR algorithm, to find a primary FCP in the floor control overlay in order to send floor requests to the primary FCP. In another possible embodiment, the ReDiR tree may be created such that each joining peer node is enabled to find its primary FCP by using, for example, a node identity of the joining peer node, or alternatively a randomly generated key, as key in the ReDiR service discovery process. More specifically, this key is used as input to the ReDiR algorithm. Thereby, the load on different FCPs will be balanced more or less evenly since the joining peer nodes will use their own unique keys as input to the ReDiR algorithm of the ReDiR service discovery process, resulting in a more or less random selection of primary FCPs.

In a further action 204, the first peer node also creates a floor chair function configured to maintain a floor record with information about utilization of the at least one floor and to provide this information to the FCPs. The general function of a floor chair in a teleconference has been explained above in the Background, which is valid and useful here as well. Thereby, joining peer nodes are enabled to join the teleconference and find respective primary FCPs in the floor control overlay based on the tree structure, and to make input to the at least one floor of the teleconference depending on the information in the floor record. In a possible embodiment, the floor chair function may be created by appointing at least one of the first peer node and the FCPs to act as floor chair. For example, a subset of the FCPs may be appointed as floor chairs each handling a separate floor chair such that one FCP handles speech, another FCP handles video, yet another FCP handles whiteboard, and so forth. As said above, the first peer node may appoint itself as floor chair as well. It is also possible that one FCP is appointed to handle more than one floor chair function. The appointment of floor chairs may likewise depend on capabilities of the FCPs.

In further possible embodiments, the above-described protocol BFCP may be used for communication between the FCPs and the participating peer nodes, while the floor control overlay may be maintained using the RELOAD protocol. Some examples of using these protocols will be described in more detail below with reference to the signaling diagrams in FIGS. 4 and 9.

Figure 2:
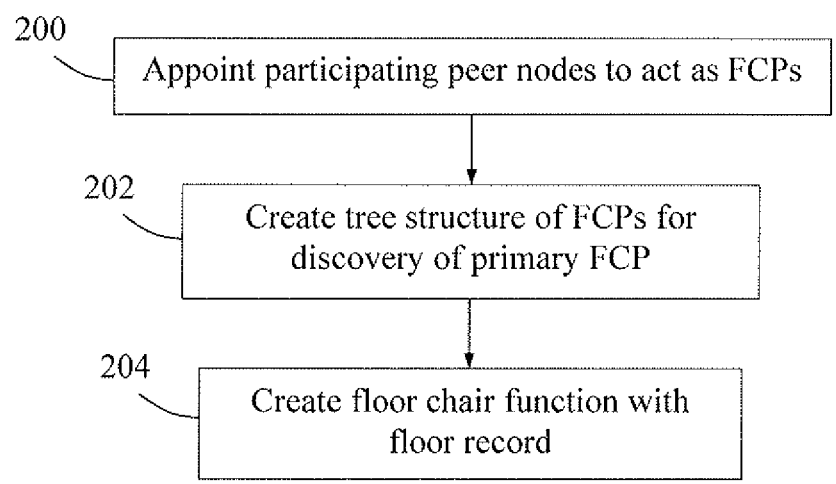
FIG. 2 is a flow chart illustrating a procedure performed by a first peer node, according to some possible embodiments.
Figure 3:
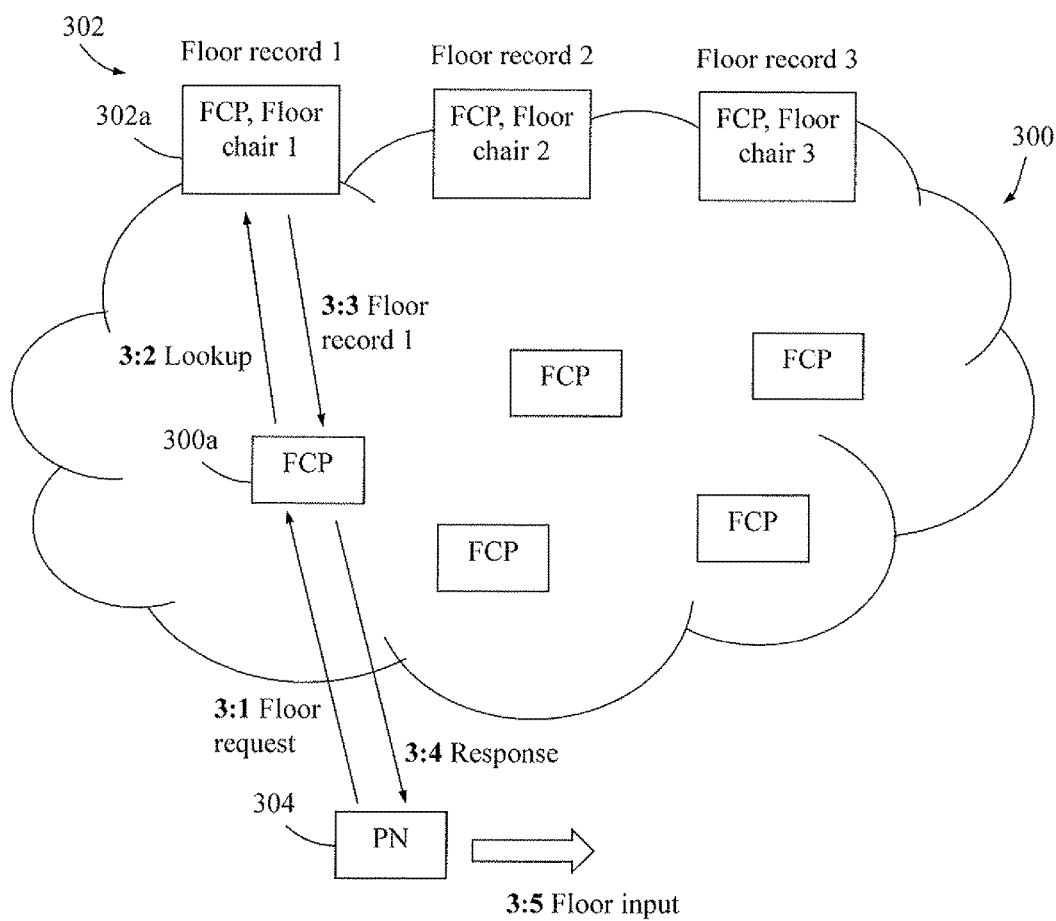
FIG. 3 is a communication scenario illustrating how a peer node can make input to a teleconference, according to further possible embodiments.

An example of a scenario is shown in FIG. 3 where a floor control overlay 300 with FCPs has been established for a teleconference by means of one of the FCPs, e.g. in the manner described for FIG. 2 above. The floor control overlay 300 also comprises three FCPs 302 which have been appointed to act as floor chairs 1, 2 and 3, respectively, thus creating a floor chair function e.g. as in action 204 above. The floor chair FCPs 302 maintain respective floor records 1, 2 and 3 which contain information about utilization of the respective floors. This utilization information may refer to one or more of the following: 1) is the floor currently free or occupied? 2) Which peer is currently making input to the floor? 3) Which peers are currently queued for making input to the floor? And so forth. Further, the floor chair FCPs 302 are capable of providing this information to the FCPs in the floor control overlay 300.

It should be noted that the floor chair FCPs 302 are also considered part of the floor control overlay 300 and any of the FCPs shown in this example may act as a peer node participating in the teleconference and may make input to any of the floors. Furthermore, one particular FCP acting as primary FCP for one or more participating peer nodes, may in turn have discovered another FCP as its own primary FCP, depending on the outcome of the algorithm, e.g. the ReDiR based algorithm, used by the particular FCP for service discovery. Alternatively, each FCP may act as its own primary FCP when making floor requests, to reduce the amount of signaling in the network.

In this example, a participating peer node 304 has discovered and selected the FCP 300a as its primary FCP. Therefore, the peer node 304 sends a floor request to the primary FCP 300a, in an action 3:1, thus asking for permission to make input to one of the floors, i.e. floor 1, which is handled by the FCP 302a of floor chair 1. The primary FCP 300a then contacts the FCP 302a for lookup in the floor record 1 maintained by FCP 302a, in a following action 3:2. In response thereto, the FCP 302a returns the floor record 1 with information about utilization of floor 1 to the primary FCP 300a, in an action 3:3.

The primary FCP 300a then checks the floor record 1 and detects that the floor 1 is currently free and unoccupied. The primary FCP 300a can thus grant permission to make input to floor 1 and sends accordingly a fitting response to the requesting peer 304, in an action 3:4, allowing peer node 304 to make such input to floor 1. A final action 3:5 indicates schematically that peer node 304 makes some input to floor 1, which may be done according to any conventional mechanisms and protocols not necessary to describe here as such since they are outside the scope of this solution.

Figure 4:
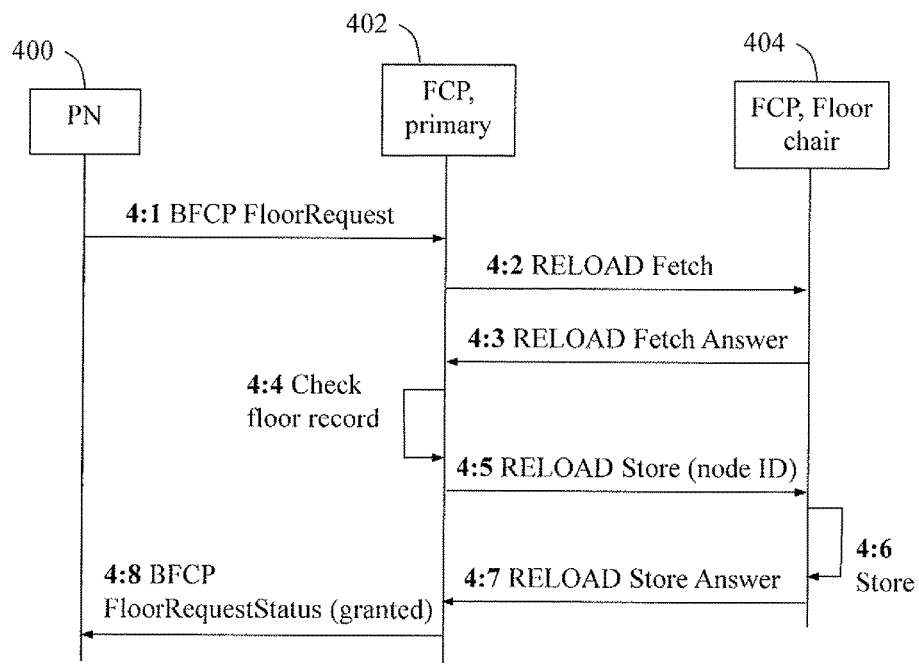
FIG. 4 is a signaling diagram illustrating some possible messages in a procedure when a peer node is permitted to make input to a teleconference, according to further possible embodiments.

FIG. 4 illustrates a more detailed example of using specific messages according to the protocols BFCP and RELOAD in a procedure such as that described for FIG. 3. Thus, a participating peer node 400, having discovered its primary FCP 402, will ask for permission to make input to a floor handled by a floor chair FCP 404 upon receiving some manual input command from a user, e.g. touching a button called "speak" or the like. The primary FCP 402 and the floor chair FCP 404 are included in a floor control overlay, like the above-described. It should be noted that the messages in this figure exchanged between the nodes 402 and 404 may be conveyed across other nodes in the floor control overlay, not shown here for simplicity.

The peer node 400 thus sends a message called "BFCP FloorRequest" referring to that floor, to the primary FCP 402, in a first shown action 4:1, which corresponds to action 3:1 in FIG. 3. This message also contains a node identity of the sending node 400, thus identifying the node 400 in the P2P network. The primary FCP 402 then performs a lookup in the floor record maintained by floor chair FCP 404, by sending a message called "RELOAD Fetch" to the floor chair FCP 404 across the floor control overlay, in a next action 4:2, corresponding to action 3:2 in FIG. 3. The floor chair FCP 404 responds by sending a message called "RELOAD Fetch Answer" to the primary FCP 402 across the floor control overlay, in a further action 4:3, corresponding to action 3:3 in FIG. 3. This message contains the floor record.

The primary FCP 402 then checks the received floor record, in a further action 4:4, and finds that the floor is currently free and unoccupied. The primary FCP 402 further sends a message called "RELOAD Store" to the floor chair FCP 404 across the floor control overlay, in a next action 4:5, referring to the node identity of the requesting peer node 400. In response thereto, the floor chair FCP 404 stores the node identity of node 400 in the floor record, in an action 4:6, to register that the floor is utilized by node 400, and sends a message called "RELOAD Store Answer" to the primary FCP 402 across the floor control overlay, in another action 4:7. Finally, the primary FCP 402 sends a message called "BFCP FloorRequestStatus" to the requesting peer node 400, in a last shown action 4:8, which message indicates that the floor has been granted to the peer node 400 for utilization, i.e. making input thereto.

The above example illustrates that the protocol BFCP can be used in the communication between the requesting peer node 400 and its primary FCP 402, while the protocol RELOAD can be used in the communication between the primary FCP 402 and the floor chair FCP 404 across the floor control overlay. However, the solution is not limited to these two protocols. Alternatively, a protocol called Talk Burst Control Protocol, TBCP may be used for floor control, as an example in addition to BFCP. TBCP is also used for the well-known service Push-to-Talk for Cellular, PoC.

Figure 5:
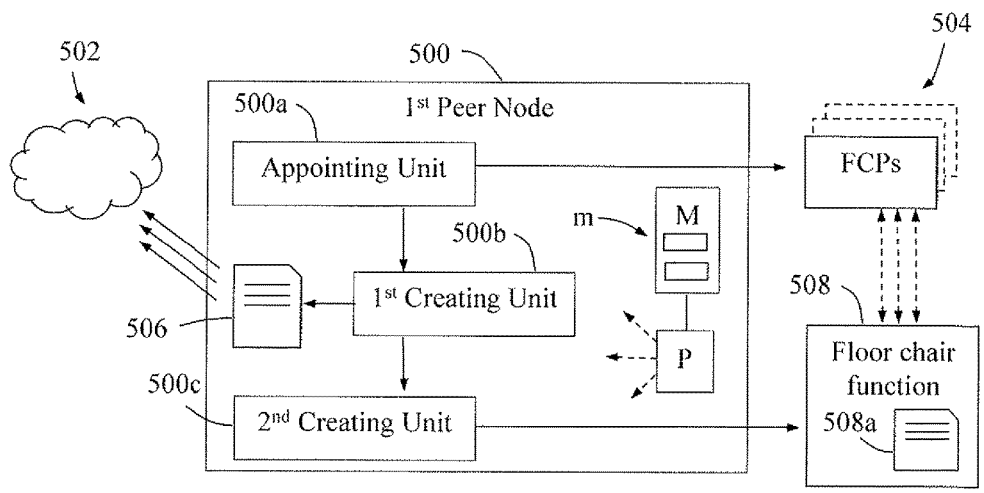
FIG. 5 is a block diagram illustrating a first peer node in more detail when used, according to further possible embodiments.

A detailed but non-limiting example of how a first peer node may be arranged to accomplish the above-described embodiments, is illustrated by the block diagram in FIG. 5.

The first peer node 500 is configured to enable a teleconference involving multiple participating peer nodes, not shown, in the P2P network 502, e.g. according to the procedures and features described above for any of FIGS. 2-4, respectively. The participating peer nodes are capable of making input to at least one floor of the teleconference. The first peer node 500 will now be described in terms of a possible example of employing the solution.

The first peer node 500 comprises an appointing unit 500*a* adapted to appoint a subset of the peer nodes participating in the teleconference to act as FCPs 504 which form a floor control overlay in the P2P network. When appointed, the FCPs are basically instructed to handle floor requests from peer nodes by granting, denying or suspending permission to make input to the at least one floor.

The first peer node 500 further comprises a first creating unit 500*b* adapted to create a tree structure 506 in which the appointed FCPs are registered, which tree structure is distributed to the P2P network 502. Thereby, the tree structure can be accessed by a joining peer node to discover a primary FCP in the tree when the joining peer node joins the teleconference, such that the joining peer node can send floor requests to the discovered primary FCP. The tree is created and built up as long as more peer nodes join the teleconference some of which are appointed as FCPs, which procedure has been described above. In practice, the tree structure may thus be distributed to the P2P network 502 "gradually", i.e. information about each FCP added to the tree is distributed one by one as they become appointed.

The first peer node 500 also comprises a second creating unit 500*c* adapted to create a floor chair function 508 which is configured to maintain a floor record 508*a* with information about utilization of the at least one floor and to provide this information to the FCPs, e.g. as described for actions 3:3 and 4:3 above, which is also schematically shown by dashed two-way arrows. Thereby, any joining peer nodes, not shown, in the P2P network 502 are enabled to join the teleconference and find respective primary FCPs in the floor control overlay based on the tree structure, and to make input to the at least one floor of the teleconference depending on the information in the floor record.

The first peer node 500 and its functional units 500*a-c* may be configured or adapted to operate according to various optional embodiments. In a possible embodiment, the first creating unit 500*b* is further adapted to create the tree structure 506 of the FCPs as a Recursive Distributed Rendezvous, ReDiR tree which enables the joining peer nodes to run a ReDiR service discovery process to find a primary FCP in the floor control overlay in order to send floor requests to the primary FCP. In that case, the first creating unit 500*b* may also be adapted to create the ReDiR tree such that each joining peer node is enabled to find its primary FCP by using a node identity of the joining peer node or a random key as key in the ReDiR service discovery process.

In further possible embodiments, the appointing unit 500*a* may be adapted to determine the number of FCPs in the teleconference based on a density parameter indicating a percentage of the number of peer nodes participating in the teleconference. In that case, the appointing unit 500*a* may be further adapted to appoint the FCPs one by one according to the density parameter when the peer nodes join the teleconference. The density parameter may be adaptive depending on the number of peer nodes participating in the teleconference.

The first peer node may be further adapted to use the protocol BFCP for communication with the FCPs and the participating peer nodes, and may be further adapted to maintain the floor control overlay by using the RELOAD protocol, e.g. as partly illustrated in FIG. 4.

Some other possible embodiments of the first peer node are mentioned below. The first creating unit 500*b* may be adapted to define a conference Uniform Resource Identifier, URI as namespace of the tree structure. The second creating unit 500*c* may be further adapted to create the floor chair function by appointing at least one of the first peer node and the FCPs to act as floor chair. The appointing unit 500*a* may be further adapted to appoint the FCPs based on capabilities of the FCPs.

Figure 6:
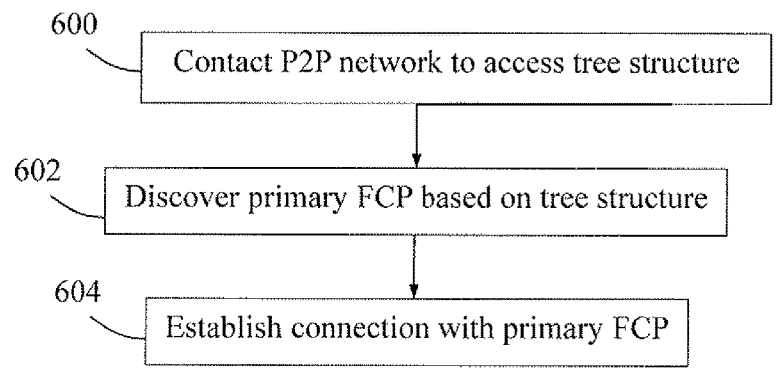
FIG. 6 is a flow chart illustrating a procedure in a joining peer node, according to further possible embodiments.

An example of a procedure performed by a joining peer node in a P2P network, for joining a teleconference involving multiple peer nodes in the P2P network, will now be described with reference to the flow chart in FIG. 6. It is assumed that the joining peer node is capable of making input to at least one floor of the teleconference, and that a tree structure with appointed FCPs as nodes has been created for the teleconference basically in the manner described above. In a first shown action 600, the joining peer node contacts the P2P network to access the tree structure in which the FCPs of the floor control overlay are registered. This may be done when a user enters a conference URI as input to the joining peer node, which has been defined as namespace of the tree structure, e.g. in a format such as the above-mentioned conference1@overlay.net or similar.

In a next action 602, the joining peer node discovers a primary FCP in the floor control overlay based on the accessed tree structure. It has been described in more detail above how this can be done, particularly in connection with action 202 in FIG. 2 where the ReDiR service discovery process and ReDiR based algorithm were described as useful examples. Thus, if the tree structure is a ReDiR tree, the joining peer node may run a ReDiR service discovery process to find the primary FCP in the floor control overlay. In that case, the joining peer node may find the primary FCP by using a node identity of the joining peer node or a random key as key in the ReDiR service discovery process.

A final shown action 604 illustrates that the joining peer node establishes a connection with the discovered primary FCP in order to make input to the at least one floor of the teleconference, i.e. by sending a floor request to the primary FCP as of actions 3:1 and 4:1 described above.

Figure 7:
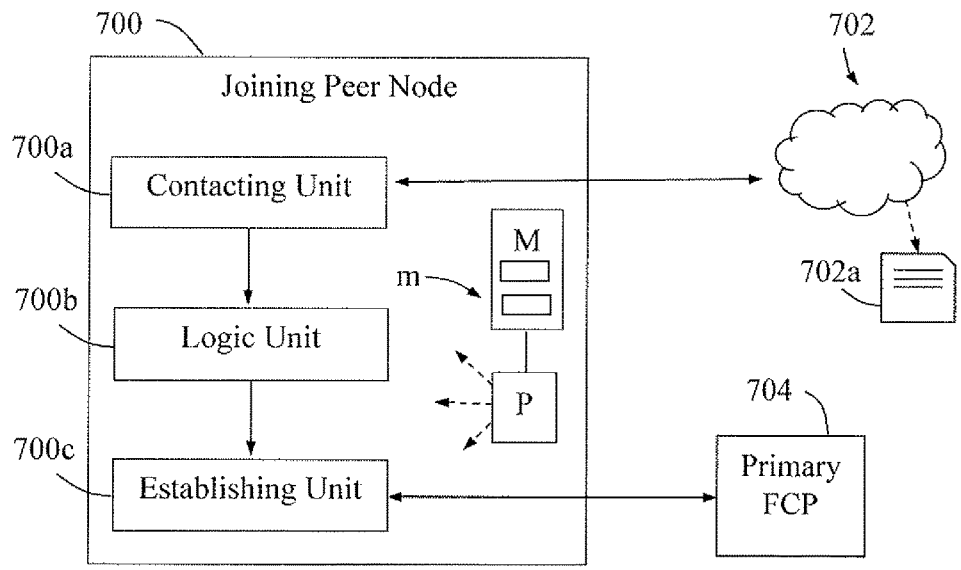
FIG. 7 is a block diagram illustrating a joining peer node in more detail when used, according to further possible embodiments.

A detailed but non-limiting example of how a joining peer node may be arranged to accomplish the above-described embodiments, is illustrated by the block diagram in FIG. 7. The joining peer node 700 is configured to join a teleconference involving multiple peer nodes in the P2P network, and is capable of making input to at least one floor of the teleconference. The joining peer node 700 will now be described in terms of a possible example of employing the solution.

The joining peer node 700 comprises a contacting unit 700*a* adapted to contact a P2P network 702 to access a tree structure 702*a* in which FCPs of the floor control overlay are registered. It is further assumed that the tree structure 702*a* has been distributed across the P2P network 702, as described above particularly in connection with action 202 of FIG. 2.

The joining peer node 700 further comprises a logic unit 700*b* adapted to discover a primary FCP 704 in the floor control overlay based on the accessed tree structure 702*a*. In this process, if the tree structure is a ReDiR tree, the logic unit 700*b* may be adapted to run a ReDiR service discovery process to find the primary FCP 704 in the floor control overlay. Also, the logic unit 700*b* may be adapted to find the primary FCP 704 by using a node identity of the joining peer node or a random key as key in the ReDiR service discovery process.

The joining peer node 700 also comprises an establishing unit 700c adapted to establish a connection with the primary FCP 704 in order to make input to the at least one floor of the teleconference, i.e. by sending a floor request to FCP 704.

It should be noted that FIGS. 5 and 7 illustrate various functional units in the first peer node 500 and the joining peer node 700, respectively, and the skilled person is able to implement these functional units in practice using suitable software and hardware. Thus, the solution is generally not limited to the shown structures of the peer nodes 500 and 700, and the functional units 500a-c and 700a-c may be configured to operate according to any of the features described in this disclosure, where appropriate.

The functional units 500a-c and 700a-c described above can be implemented in the first peer node 500 and the joining peer node 700, respectively, by means of program modules of a respective computer program comprising code means which, when run by a processor "P" in respective node causes the first peer node 500 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each peer node 500, 700 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the first peer node 500 and the joining peer node 700.

Figure 8:
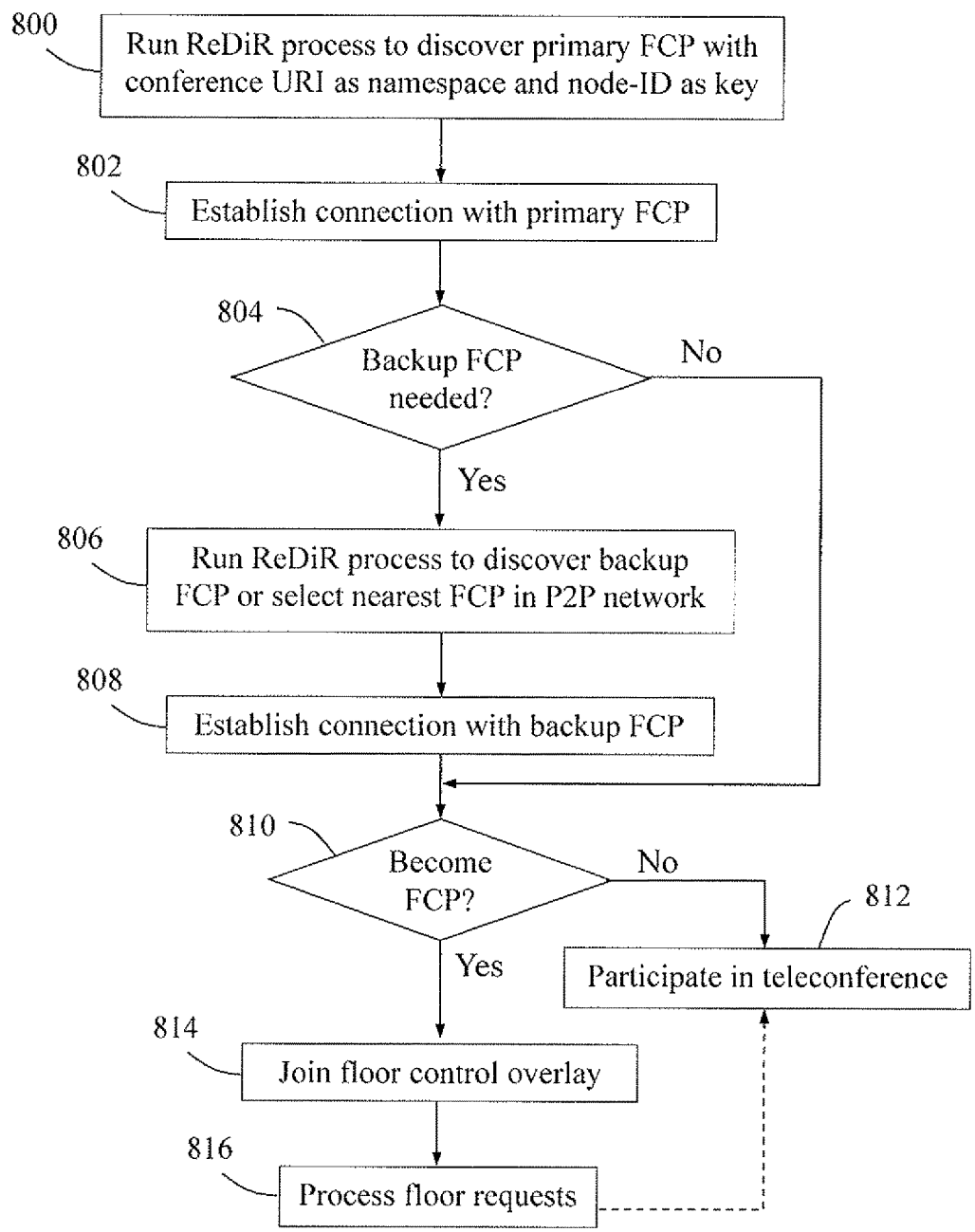
FIG. 8 is a flow chart illustrating a more detailed example of a procedure performed by a joining peer node, according to further possible embodiments.

A detailed example of how a joining peer node may act when this solution is employed, will now be briefly outlined with reference to the flow chart in FIG. 8. As in the above examples, the joining peer node basically joins a teleconference involving multiple peer nodes in a P2P network, and is capable of making input to at least one floor of the teleconference. In a first action 800, the joining peer node runs the ReDiR service discovery process to discover its primary FCP while using a known conference URI as namespace and its own node identity as key, i.e. input, to the ReDiR algorithm. Alternatively, a randomly generated key could also be used as key. In either case, a load distribution effect can be achieved across the FCPs when further joining peers use their node identities or randomly generated keys as key to the ReDiR algorithm to discover their primary FCPs. This action basically corresponds to actions 600 and 602 above.

A next action 802 illustrates that the joining peer node establishes a connection with its discovered primary FCP, corresponding to action 604 above. In a next action 804, it is determined whether the joining peer node needs, or desires, to have a backup FCP in addition to the first discovered FCP in case the latter FCP should fail or become unavailable for some reason. For example, the first discovered FCP may leave the teleconference and the joining peer node could then switch to using the backup FCP instead for sending floor requests. If such backup FCP is needed, further actions 806 and 808 are executed as follows.

In action 806, the joining peer node may run the ReDiR service discovery process once again to discover its backup FCP, using another key as input to the ReDiR algorithm. The joining peer node then establishes contact with the discovered or selected backup FCP, in another action 808. If no backup FCP is needed, the actions 806 and 808 can naturally be omitted.

In a further action 810, it is determined whether the joining peer node is to be appointed as an FCP in the floor control overlay. If not, the joining peer node can participate in the teleconference in an action 812, using the primary FCP for getting permission to make input to a floor, e.g. in the manner described above for FIG. 4. On the other hand, if it has been decided in action 810 that the joining peer node shall become an FCP, the joining peer joins the floor control overlay in an action 814, which is a procedure of which an example will be described below with reference to FIG. 9. The joining peer node will thus act as an FCP by processing floor requests for participating peer nodes having discovered it as primary FCP, in an action 816. In addition, the joining peer node can at the same time participate in the teleconference as of action 812, as indicated by the dashed arrow.

Figure 9:
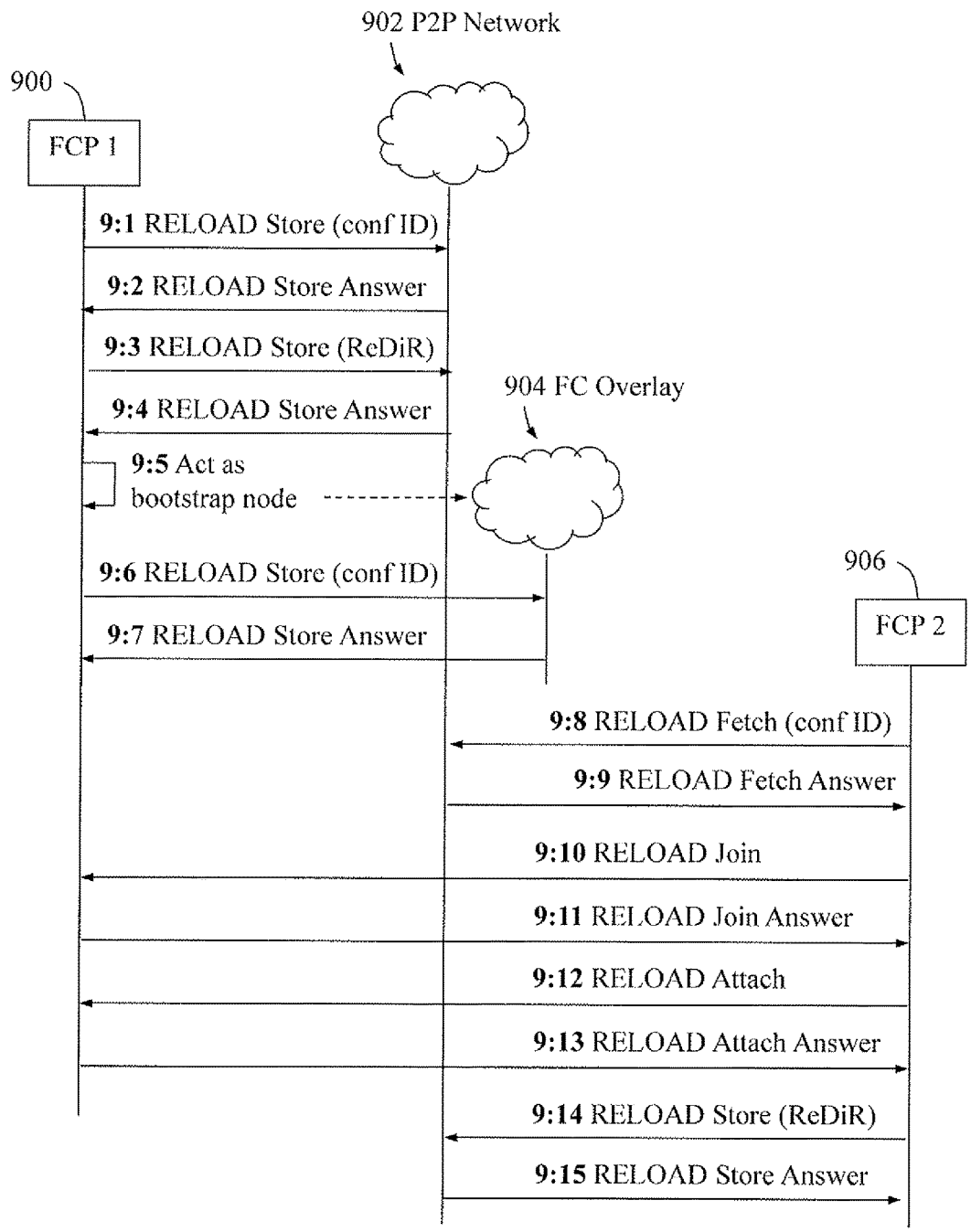
FIG. 9 is a signaling diagram illustrating an example with possible messages in a procedure when a first peer node floor creates a floor control overlay for a teleconference and a second peer node joins the floor control overlay, according to further possible embodiments.

FIG. 9 is a signaling diagram which depicts an example of using various RELOAD messages when a first peer node 900 in a P2P network 902 creates a floor control overlay 904 for a teleconference and becomes an FCP, and when a second peer node 906 in the P2P network 902 also joins the floor control overlay 904 and becomes an FCP. The P2P network 902 may be a P2PSIP overlay that the peer nodes/FCPs 900 and 906 are part of. The first FCP 900 may basically act as the above-described "first peer node" of FIGS. 2 and 5.

In a first shown action 9:1, the first FCP 900 begins with sending a "RELOAD Store" message across the P2P network 902, using a conference URI as conference1@overlay.net as input to an algorithm, e.g. the ReDiR algorithm, in order to create the teleconference. In more detail, the first FCP 900 inputs the conference URI to the algorithm to generate a Resource identity for the resource record of the conference. A next action 9:2 illustrates that the first FCP 900 receives a "RELOAD Store Answer" message as a response from the P2P network 902, confirming that the conference URI has been stored in the P2P network 902.

Action 9:3 illustrates that the first FCP 900 sends another "RELOAD Store" message across the P2P network 902 for storing a resource record as a node to start building a ReDiR tree, suitably beginning with itself, i.e. the first FCP 900. A next action 9:4 illustrates that the first FCP 900 receives a "RELOAD Store Answer" message as a response from the P2P network 902, confirming that the node has been stored in the P2P network 902. Actions 9:3 and 9:4 are then repeated for each new node added in the ReDiR tree, as new peer nodes join the conference and a subset of them are appointed as FCPs which are registered in the ReDiR tree in this manner. The subset of joining peer nodes appointed as FCPs may be determined by a density parameter, as described above. The repeated actions 9:3 and 9:4 represent the building of the ReDiR tree with registered FCPs. Thus, the first FCP 900 and also other appointed FCPs joining the floor control overlay store their information in multiple ReDiR tree nodes.

Storing a node in the ReDiR tree means that a resource record of that node is stored individually in the P2P network 902. The resource record includes at least a node identity and may further optionally include various information about the conference. Each tree node/resource record may be stored in a different peer in the P2P network 902. Thus, the ReDiR tree is made up of tree nodes distributed across the network 902.

Another action 9:5 shows that the first FCP 900 acts as a bootstrap FCP being the first point of contact for any joining peer nodes and appoints a subset of them as FCPs, thereby building up the floor control overlay 904, as indicated by the dashed arrow. Action 9:6 illustrates that the first FCP 900 sends another "RELOAD Store" message across the P2P network 902 for registering a peer node appointed as floor chair in the ReDiR tree. A next action 9:7 illustrates that the first FCP 900 receives a "RELOAD Store Answer" message as a response from the P2P network 902, confirming that the floor chair node has been stored in the P2P network 902.

The following actions illustrate that the shown second peer node/FCP 906 is first a joining peer node and then becomes an FCP in the teleconference by joining the floor control overlay 904. Thus, in an action 9:8, the second peer node 906, i.e. not yet an FCP, starts to perform a ReDiR service discovery process in the overlay to discover the identity of an FCP already participating in the conference which is identified by the URI conference1@overlay.net. The ReDiR service discovery process typically involves one or more ReDiR Fetch requests and answers. Since the first FCP 900 is the only FCP participating in the conference, the ReDiR service discovery process returns the identity of the first FCP 900. A next action 9:9 thus illustrates that the second peer node 906 receives a "RELOAD Fetch Answer" message as a response from the P2P network 902, containing the node identity of the first FCP 900.

The second peer node 906 then sends a "RELOAD Join" message to the first FCP 900, in an action 9:10, requesting to join the floor control overlay 904. The second peer node 906 receives a "RELOAD Join Answer" message as a response from the first FCP 900, in a next action 9:11, confirming that the second peer node 906 is accepted to become FCP in the floor control overlay 904.

Before actions 9:10 and 9:11, the second peer node 906 is appointed as FCP which may be done in different ways. In one possible example, the second peer node 906 sends a BFCP request to the FCP 900 which request may be called an "Init" message. Having received the Init message, the FCP 900 determines whether the peer node 906 should be upgraded from a joining peer to an FCP. This may be determined by the above-described density parameter, in this case, the FCP 900 will reject the Init message and indicate to the peer node 906 that it should start the FCP upgrade procedure.

An example of the content of the BFCP Init message is given below:
Ver: 1
Primitive: Init
Payload Length: 0
Conference ID: 123456
Transaction ID: 789
User ID: 1011

When the Init message is to be rejected, this can be done using a BFCP Error message which carries a BFCP ERROR-CODE attribute, whose Error Code value may be set to a new value denoted "Max FCP capacity reached". Reception of this error code may trigger the peer node 906 to become FCP.

Alternatively, in another possible example, the peer node 906 may itself determine whether it should become an FCP, without contacting an existing FCP. The peer node 906 can do this by checking the value of the density parameter from a conference configuration document stored in the P2P network overlay. Having done this, the peer node 906 is able to determine whether it should become and FCP in a probabilistic manner as follows. As an example, let us assume that the density parameter has a value of 100. In this case, 1 out of 100 joining peer nodes should become an FCP. To determine whether to become an FCP or not, the peer node 906 may generate a random integer in the range of 0-100. The peer node 906 can upgrade itself to an FCP only if the generated random integer is a pre-set integer between 0 and 99, e.g. 0. If the randomly generated integer is not equal to the pre-set integer, the peer node 906 may just act as a participating node in the conference.

Returning to the example shown in FIG. 9, the peer node 906 will actually become an FCP. in another action 9:12, the peer node 906 sends a "RELOAD Attach" message to the P2P network 902 for attaching to the floor control overlay 904, and receives a "RELOAD Attach Answer" message as a response from the first FCP 900, in a next action 9:13, confirming that the peer node 906 can be attached to the floor control overlay 904 in order to become an FCP. Finally, the second peer node 906 sends a "RELOAD Store" message to the P2P network 902, in a next action 9:14, for registering as an FCP node in the ReDiR tree, which tree was distributed in the P2P network 902 as of the repeated actions 9:3, 9:4. The second FCP 906 then duly receives a "RELOAD Store Answer" message as a response from the P2P network 902, in a last shown action 9:15, confirming that the second FCP 906 has been registered as an FCP node in the ReDiR tree distributed in the P2P network 902. Actions 9:14 and 9:15 may be repeated N times if it is required that the second FCP 906 is registered N times as a node in the ReDiR tree. Typically, a node registering itself in a ReDiR tree generally stores its node identity in multiple tree nodes, which is a common procedure as such. In this case, N store requests and answers are performed.

Advantages that can be achieved when implementing the solution according to any of the embodiments described above, may include any of the following:

A) No centralized and costly servers and nodes are required for floor control since existing and available peer nodes can be utilized "for free", more or less, to temporarily accomplish the FCP and floor chair functionalities.

B) The floor control overlay is scalable in that the number of FCPs and floor chairs can be adapted depending on the number of participants and/or depending on the floor functions to be used.

C) The floor control overlay is not very sensitive to equipment failure since a disconnected, faulty or malfunctioning peer node in the floor control overlay can easily be replaced by another peer node.

While the solution has been described with reference to specific exemplary embodiments, the description is generally only intended to illustrate the inventive concept and should not be taken as limiting the scope of the solution. For example, the terms "peer node", "floor control peer", "floor", "floor chair", "floor request", "tree structure" and "input" have been used throughout this description, although any other corresponding entities, functions, and/or parameters could also be used having the features and characteristics described here. The solution is defined by the appended claims.

The invention claimed is:
1. A method, performed by a first peer node in a peer-to-peer (P2P) network, for enabling a teleconference involving multiple peer nodes in the P2P network, the peer nodes being capable of making input to at least one floor of the teleconference, the method comprising:
   appointing a subset of the peer nodes to act as Floor Control Peers (FCPs), which form a floor control overlay in the P2P network, each one of the FCPs being operable to receive from a peer node a floor request requesting that the peer node be allowed to make an input to a particular floor of the teleconference and further being configured such that, in response to the floor request, the FCP determines whether to grant or deny the floor request based on a floor record comprising information about the particular floor;
   creating a tree structure in which each peer node that is appointed as an FCP is registered, which tree structure is distributed to the P2P network and can be accessed by a joining peer node to discover a primary FCP in the tree when joining the teleconference such that the joining peer node can send floor requests to the primary FCP; and
   creating, in the floor control overlay, a floor chair function configured to maintain a floor record with information about utilization of the at least one floor and to provide said information to the FCPs, wherein
   appointing a subset of the peer nodes to act as FCPs comprises: detecting that a new peer node has joined the teleconference, and after detecting that the new peer node has joined the teleconference, determining whether the new peer node should be appointed as one of the Floor Control Peers, wherein the determination is based on a density parameter (D) and the total number of peer nodes currently participating in the teleconference (T), and
   determining whether the new peer node should be appointed as one of the Floor Control Peers comprises determining whether T modulo D =0, and
   the new peer node is appointed as one of the Floor Control Peers as a result of determining that T modulo D =0.

2. The method of claim 1, wherein the tree structure of the FCPs is created as a Recursive Distributed Rendezvous, ReDiR tree which enables the joining peer nodes to run a ReDiR service discovery process to find a primary FCP in the floor control overlay in order to send floor requests to the primary FCP.

3. The method of claim 2, wherein the ReDiR tree is created such that each joining peer node is enabled to find its primary FCP by using a node identity of the joining peer node or a random key as key in the ReDiR service discovery process.

4. The method of claim 1, wherein the number of FCPs in the teleconference is determined based on a density parameter and the total number of peer nodes participating in the teleconference.

5. The method of claim 4, wherein the FCPs are appointed one by one according to the density parameter when the peer nodes join the teleconference.

6. The method of claim 4, wherein the density parameter is adaptive depending on the number of peer nodes participating in the teleconference.

7. The method of claim 1, wherein a Binary Floor Control Protocol is used for communication between the FCPs and the participating peer nodes.

8. The method of claim 1, wherein the floor control overlay is maintained using a Resource Location And Discovery protocol.

9. The method of claim 1, wherein a conference Uniform Resource Identifier is defined as namespace of the tree structure.

10. The method of claim 1, wherein the floor chair function is created by appointing at least one of the first peer node and the FCPs to act as floor chair.

11. The method of claim 1, wherein the FCPs are appointed based on capabilities of the FCPs.

12. A first peer node in a peer-to-peer (P2P) network comprising multiple participating peer nodes in the P2P network which are capable of making input to at least one floor of the teleconference, the first peer node being configured to:
   appoint a subset of the peer nodes to act as Floor Control Peers (FCPs), which form a floor control overlay in the P2P network, each one of the FCPs being operable to receive from a peer node a floor request requesting that the peer node be allowed to make an input to a particular floor of the teleconference and further being configured such that, in response to the floor request, the FCP determines whether to grant or deny the floor request based on a floor record comprising information about the particular floor;
   create a tree structure in which each peer node that is appointed as an FCP is registered, which tree structure is distributed to the P2P network and can be accessed by a joining peer node to discover a primary FCP in the tree when joining the teleconference such that the joining peer node can send floor requests to the primary FCP; and
   create, in the floor control overlay, a floor chair function configured to maintain a floor record with information about utilization of the at least one floor and to provide said information to the FCPs, wherein
   the first peer node is configured to appoint a subset of peer nodes to act as FCPs by performing steps comprising: detecting that a new peer node has joined the teleconference, determining whether the new peer node should be appointed as one of the Floor Control Peers, wherein the determination is based on a density parameter (D) and the total number of peer nodes currently participating in the teleconference (T), and determining whether the new peer node should be appointed as one of the Floor Control Peers comprises determining whether T modulo D =0, and
   the first peer node is configured such that the first peer node appoints the new peer node as one of the Floor Control Peers as a result of determining that T modulo D=0.

13. The first peer node of claim 12, wherein the first peer node is further adapted to create the tree structure of the FCPs as a Recursive Distributed Rendezvous (ReDiR) tree which enables the joining peer nodes to run a ReDiR service discovery process to find a primary FCP in the floor control overlay in order to send floor requests to the primary FCP.

14. The first peer node of claim 13, wherein the first peer node is further adapted to create the ReDiR tree such that each joining peer node is enabled to find its primary FCP by using a node identity of the joining peer node or a random key as key in the ReDiR service discovery process.

15. The first peer node of claim 12, wherein the first peer node is further adapted to determine the number of FCPs in the teleconference based on a density parameter indicating a percentage of the number of peer nodes participating in the teleconference.

16. The first peer node of claim 15, wherein the first peer node is further adapted to appoint the FCPs one by one according to the density parameter when the peer nodes join the teleconference.

17. The first peer node of claim 15, wherein the density parameter is adaptive depending on the number of peer nodes participating in the teleconference.

18. The first peer node of claim 12, further adapted to use a Binary Floor Control Protocol, BFCP for communication with the FCPs and the participating peer nodes.

19. The first peer node of claim 12, further adapted to maintain the floor control overlay by using a Resource Location And Discovery, RELOAD protocol.

20. The first peer node of claim 12, wherein the first peer node is further adapted to define a conference Uniform Resource Identifier, URI as namespace of the tree structure.

21. The first peer node of claim 12, wherein the first peer node is further adapted to create the floor chair function by appointing at least one of the first peer node and the FCPs to act as floor chair.

22. The first peer node of claim 12, wherein the a first peer node is further adapted to appoint the FCPs based on capabilities of the FCPs.

* * * * *